(12) United States Patent
Wu et al.

(10) Patent No.: US 11,929,951 B2
(45) Date of Patent: Mar. 12, 2024

(54) SIDELINK POSITIONING REFERENCE SIGNAL TRANSMISSIONS

(71) Applicant: QUALCOMM Incorporated, San Diego, CA (US)

(72) Inventors: Shuanshuan Wu, San Diego, CA (US); Arthur Gubeskys, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 17/443,003

(22) Filed: Jul. 19, 2021

(65) Prior Publication Data

US 2023/0015004 A1 Jan. 19, 2023

(51) Int. Cl.
*H04L 5/00* (2006.01)
*H04W 72/044* (2023.01)
*H04W 24/10* (2009.01)
*H04W 64/00* (2009.01)

(52) U.S. Cl.
CPC ......... *H04L 5/0048* (2013.01); *H04W 72/044* (2013.01); *H04W 24/10* (2013.01); *H04W 64/00* (2013.01)

(58) Field of Classification Search
CPC .............. H04L 5/0048; H04L 5/0051; H04L 2025/03783; H04L 27/261; H04L 67/104; H04L 67/1091; H04L 51/222; H04W 72/044; H04W 72/0453; H04W 64/00; H04W 64/003; H04W 64/006; H04W 72/25; H04W 72/40; H04W 74/00; H04W 74/002; H04W 28/0875; H04W 24/10; H04W 4/02
See application file for complete search history.

(56) References Cited

U.S. PATENT DOCUMENTS

2021/0058889 A1* 2/2021 Zhang .................. G01S 5/10
2021/0329693 A1* 10/2021 Nogami ............ H04W 72/0453
2022/0007396 A1* 1/2022 Jiang .................. H04W 72/1268
(Continued)

FOREIGN PATENT DOCUMENTS

CN WO2023/001096 * 1/2023 ............ H04W 64/00
WO WO-2021112610 A1 * 6/2021 ............... H04L 1/08
(Continued)

OTHER PUBLICATIONS

International Search Report and Written Opinion—PCT/US2022/072956—ISA/EPO—dated Sep. 14, 2022.
(Continued)

*Primary Examiner* — Warner Wong
(74) *Attorney, Agent, or Firm* — Harrity & Harrity, LLP

(57) ABSTRACT

Various aspects of the present disclosure generally relate to wireless communication. In some aspects, a sidelink transmitting (Tx) mobile station may perform a sub-band channel access in candidate frequency resources of an unlicensed band for a sidelink positioning reference signal (PRS) transmission to occur in time resources. The Tx may transmit, from the sidelink Tx mobile station to a sidelink receiving (Rx) mobile station, the sidelink PRS transmission in one or more sub-bands of the unlicensed band that have passed the sub-band channel access. Numerous other aspects are described.

30 Claims, 10 Drawing Sheets

(56) References Cited

U.S. PATENT DOCUMENTS

| | | | | |
|---|---|---|---|---|
| 2022/0368488 | A1* | 11/2022 | Berggren | H04L 5/0032 |
| 2022/0377697 | A1* | 11/2022 | Bi | G01S 5/10 |
| 2022/0394657 | A1* | 12/2022 | Vassilovski | G01S 13/765 |
| 2022/0416976 | A1* | 12/2022 | Baek | H04W 72/51 |
| 2023/0007956 | A1* | 1/2023 | Wu | H04W 64/00 |
| 2023/0062805 | A1* | 3/2023 | Baek | H04W 64/00 |
| 2023/0081093 | A1* | 3/2023 | Manolakos | H04W 72/21 |
| 2023/0152413 | A1* | 5/2023 | Kim | H04L 5/0051 |
| | | | | 370/329 |
| 2023/0198708 | A1* | 6/2023 | Hong | G01S 5/02 |
| | | | | 370/329 |
| 2023/0221397 | A1* | 7/2023 | Baek | G01S 5/0063 |
| | | | | 455/456.1 |
| 2023/0262494 | A1* | 8/2023 | Dai | H04W 64/006 |
| | | | | 370/252 |
| 2023/0362874 | A1* | 11/2023 | Wang | H04W 64/00 |

FOREIGN PATENT DOCUMENTS

| | | | | |
|---|---|---|---|---|
| WO | WO-2021129060 A1 * | 7/2021 | | G01S 5/0072 |
| WO | WO2022/272195 * | 12/2022 | | H04W 64/00 |

OTHER PUBLICATIONS

QUALCOMM: "Email Discussion Summary for [RAN-R18-WS-non-eMBB-Qualcomm]", 3GPP TSG RAN Rel-18 workshop, RWS-210590, 3rd Generation Partnership Project, Mobile Competence Centre, 650, Route Des Lucioles, F-06921 Sophia-Antipolis Cedex, France, vol. RAN WG3, No. Electronic Meeting, Jun. 28, 2021-Jul. 2, 2021, Jun. 25, 2021, XP052029052, 146 Pages, Sections 5 and 16, p. 47, lines 11-16.

QUALCOMM Incorporated (Moderator): "Email Summary on NR Positioning", 3GPP Draft, RP-192412, 3GPP TSG-RAN Meeting #86, 3rd Generation Partnership Project, Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 2, 2019, XP051834111, 87 Pages, p. 11, 5th and 6th row, the whole document.

QUALCOMM: "On Sidelink Positioning", 3GPP TSG RAN Rel-18 workshop, RWS-210008, 3rd Generation Partnership Project, Mobile Competence Centre, 650, Route Des Lucioles, F-06921 Sophia Antipolis Cedex, France, vol. TSG RAN, No. Electronic Meeting, Jun. 28, 2021-Jul. 2, 2021, Jun. 7, 2021, 8 Pages, XP052025577.

* cited by examiner

SIDELINK POSITIONING REFERENCE SIGNAL TRANSMISSIONS

FIELD OF THE DISCLOSURE

Aspects of the present disclosure generally relate to wireless communication and to techniques and apparatuses for sidelink positioning reference signal (PRS) transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a sidelink transmitting (Tx) mobile station includes a memory and one or more processors, coupled to the memory, configured to: perform a sub-band channel access in candidate frequency resources of an unlicensed band for a sidelink positioning reference signal (PRS) transmission to occur in time resources; and transmit, from the sidelink Tx mobile station to a sidelink receiving (Rx) mobile station, the sidelink PRS transmission in one or more sub-bands of the unlicensed band that have passed the sub-band channel access.

In some implementations, an apparatus for wireless communication at a sidelink Rx mobile station includes a memory and one or more processors, coupled to the memory, configured to: receive, at the sidelink Rx mobile station from a sidelink Tx mobile station, a sidelink PRS transmission in one or more sub-bands associated with candidate frequency resources and time resources; and perform positioning-related measurements based at least in part on an aggregation of the sidelink PRS transmission received in the one or more sub-bands.

In some implementations, a method of wireless communication performed by a sidelink Tx mobile station includes performing, by the sidelink Tx mobile station, a sub-band channel access in candidate frequency resources of an unlicensed band for a sidelink PRS transmission to occur in time resources; and transmitting, from the sidelink Tx mobile station to a sidelink Rx mobile station, the sidelink PRS transmission in one or more sub-bands of the unlicensed band that have passed the sub-band channel access.

In some implementations, a method of wireless communication performed by a sidelink Rx mobile station includes receiving, at the sidelink Rx mobile station from a sidelink Tx mobile station, a sidelink PRS transmission in one or more sub-bands associated with candidate frequency resources and time resources; and performing positioning-related measurements based at least in part on an aggregation of the sidelink PRS transmission received in the one or more sub-bands.

In some implementations, a non-transitory computer-readable medium storing a set of instructions for wireless communication includes one or more instructions that, when executed by one or more processors of a sidelink Tx mobile station, cause the sidelink Tx mobile station to: perform a sub-band channel access in candidate frequency resources of an unlicensed band for a sidelink PRS transmission to occur in time resources; and transmit, from the sidelink Tx mobile station to a sidelink Rx mobile station, the sidelink PRS transmission in one or more sub-bands of the unlicensed band that have passed the sub-band channel access.

In some implementations, a non-transitory computer-readable medium storing a set of instructions for wireless communication includes one or more instructions that, when executed by one or more processors of a sidelink Rx mobile station, cause the sidelink Rx mobile station to: receive, at the sidelink Rx mobile station from a sidelink Tx mobile station, a sidelink PRS transmission in one or more sub-bands associated with candidate frequency resources and time resources; and perform positioning-related measurements based at least in part on an aggregation of the sidelink PRS transmission received in the one or more sub-bands.

In some implementations, a sidelink Tx apparatus for wireless communication includes means for performing a sub-band channel access in candidate frequency resources of an unlicensed band for a sidelink PRS transmission to occur in time resources; and means for transmitting, from the sidelink Tx apparatus to a sidelink Rx apparatus, the sidelink PRS transmission in one or more sub-bands of the unlicensed band that have passed the sub-band channel access.

In some implementations, a sidelink Rx apparatus for wireless communication includes means for receiving, at the sidelink Rx apparatus from a sidelink Tx apparatus, a sidelink PRS transmission in one or more sub-bands associated with candidate frequency resources and time resources; and means for performing positioning-related measurements based at least in part on an aggregation of the sidelink PRS transmission received in the one or more sub-bands.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
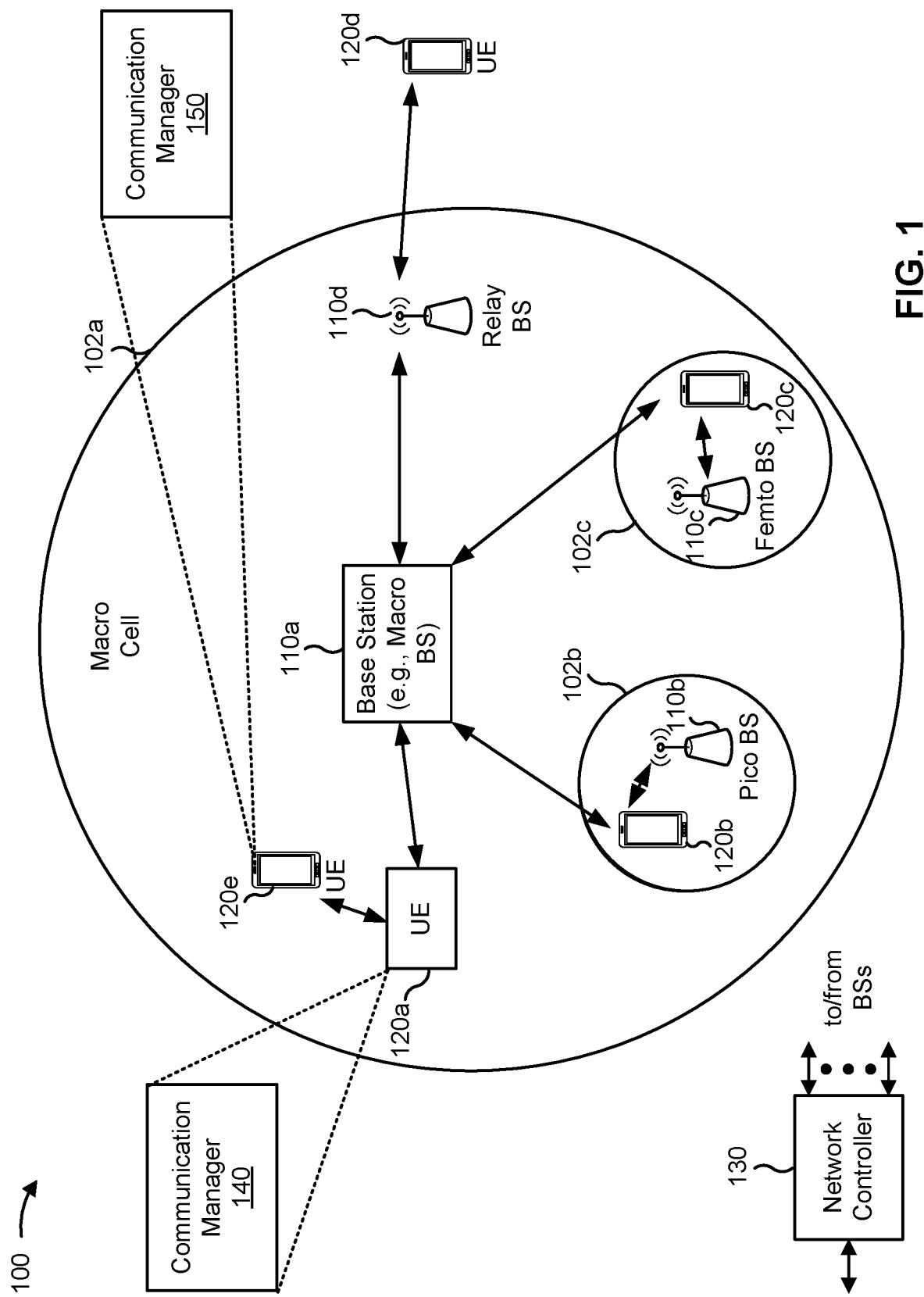
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a sidelink transmitting (Tx) mobile station (e.g., UE 120a) may include a communication manager 140. As described in more detail elsewhere herein, the communication manager 140 may perform a sub-band channel access in candidate frequency resources of an unlicensed band for a sidelink positioning reference signal (PRS) transmission to occur in time resources; and transmit, from the sidelink Tx mobile station to a sidelink receiving (Rx) mobile station, the sidelink PRS transmission in one or more sub-bands of the unlicensed band that have passed the sub-band channel access. Additionally, or alternatively, the communication manager 140 may perform one or more other operations described herein.

In some aspects, a sidelink Rx mobile station (e.g., 120e) may include a communication manager 150. As described in more detail elsewhere herein, the communication manager 150 may receive, at the sidelink Rx mobile station from a sidelink Tx mobile station, a sidelink PRS transmission in one or more sub-bands associated with candidate frequency resources and time resources; and perform positioning-related measurements based at least in part on an aggregation of the sidelink PRS transmission received in the one or more sub-bands. Additionally, or alternatively, the communication manager 150 may perform one or more other operations described herein.

As indicated above, FIG. 1 is provided as an example. Other examples may differ from what is described with regard to FIG. 1.

Figure 2:
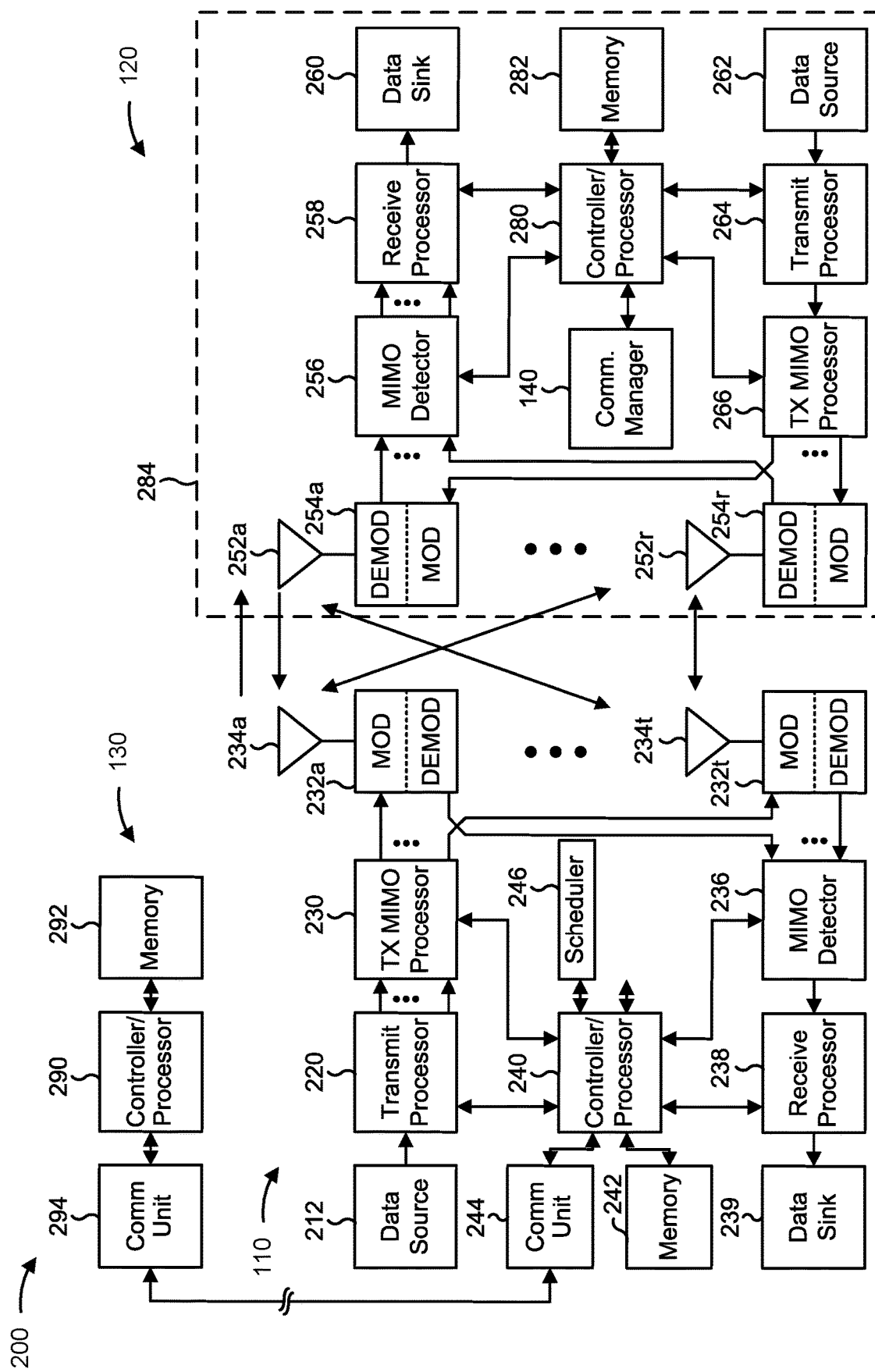
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A Tx multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with sidelink PRS transmissions, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a sidelink Tx mobile station (e.g., 120a) includes means for performing, by the sidelink Tx mobile station, a sub-band channel access in candidate frequency resources of an unlicensed band for a sidelink PRS transmission to occur in time resources; and/or means for transmitting, from the sidelink Tx mobile station to a sidelink Rx mobile station, the sidelink PRS transmission in one or more sub-bands of the unlicensed band that have passed the sub-band channel access. In some aspects, the means for the sidelink Tx mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a sidelink Rx mobile station (e.g., 120e) includes means for receiving, at the sidelink Rx mobile station from a sidelink Tx mobile station, a sidelink PRS transmission in one or more sub-bands associated with candidate frequency resources and time resources; and/or means for performing positioning-related measurements based at least in part on an aggregation of the sidelink PRS transmission received in the one or more sub-bands. In some aspects, the means for the sidelink Rx mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

For NR V2X and/or sidelink communications, a number of sidelink signals and/or physical channels have been specified for transmission. The sidelink signals and/or physical channels may be transmitted using a cellular spectrum (e.g., sidelink signals may share spectrum in a licensed cellular band). The sidelink signals and/or physical channels may be transmitted using a dedicated intelligent transportation system (ITS) spectrum. Sidelink positioning may involve sidelink based high accuracy positioning for V2X, public safety, and/or commercial use cases. Sidelink positioning may support both relative and absolute positioning. Relative positioning (e.g., ranging) may involve determining a distance between two UEs. Absolute positioning may involve determining geographic coordinates of a UE. Sidelink positioning may be performed based at least in part on measurements of sidelink PRSs transmitted over sidelink interfaces. The sidelink positioning may be based at least in part on measurements of time of arrival (ToA), time difference of arrival (TDoA), angle of arrival (AoA), and/or round-trip time (RTT) of the sidelink PRSs. A sidelink positioning accuracy may be based at least in part on a sidelink PRS bandwidth.

Some sidelink and/or V2X applications may have high accuracy requirements. For example, sub-meter level accuracy may be necessary to support vehicle maneuver coordination. Relatively large bandwidth (e.g., 80 MHz or higher) PRS transmissions may be needed to support such sidelink and/or V2X applications. The licensed spectrum and the ITS spectrum may not have such bandwidth available for sidelink PRS transmissions. Depending on geographic region, a 20-30 MHz ITS bandwidth may only be secured for V2X transmissions, and transmitting sidelink PRSs over the 20-30 MHz bandwidth may not provide a required positioning accuracy. Another possibility involves transmitting sidelink PRSs in an unlicensed spectrum. For example, Unlicensed National Information Infrastructure (UN-II) 3 or UN-II 5 may have a relatively large bandwidth available. However, the unlicensed spectrum may be shared with other RATs (e.g., WiFi). Further, access to the unlicensed spectrum may be subject to regulatory requirements, such as channel access or listen before talk (LBT).

During channel access, a UE (or mobile station) may perform sensing (or listening) of a channel, and if there are no other transmissions present, the UE may perform a transmission on the channel. On the other hand, when the channel is busy (e.g., other transmissions are occurring on the channel), the UE may not pass channel access and may not be able to perform the transmission on the channel.

During channel access, the UE may sense energy on a medium and may perform the transmission when the energy satisfies a threshold (e.g., the energy is below the threshold). Channel access (or LBT) may be one of several categories. A Category 1 LBT may not involve energy sensing (e.g., an immediate transmission may be permitted). The Category 1 LBT may be similar to a Type 2c channel access in NR-Unlicensed (NR-U). A Category 2 LBT may not involve a random back-off (e.g., a transmission may be permitted when a sensed energy in a certain period satisfies a threshold). The Category 2 LBT may be similar to a Type 2a/2b channel access in NR-U. A Category 4 LBT may involve a random back-off with a contention window of a variable size (e.g., a transmission may be permitted when sensed energy in the contention window satisfies a threshold). The Category 4 LBT may be similar to Type 1 channel access in NR-U. Category 1 LBT and Category 2 LBT may only be allowed in certain scenarios.

A UE or a roadside unit (RSU) may transmit sidelink PRSs. An RSU associated with a known location may transmit a sidelink PRS for positioning of another vehicle or pedestrian UE. A vehicle or pedestrian UE with or without a known location may transmit a sidelink PRS for absolute positioning or relative positioning. When a sidelink PRS is transmitted in the unlicensed spectrum, a transmission opportunity (e.g., a time and/or frequency resource location) may be uncertain. Uncertainty may be due to channel access, since a transmitter (e.g., an RSU, a vehicle, or pedestrian UE) may only transmit when channel access is passed.

In some cases, passing channel access may be challenging for a larger bandwidth sidelink PRS transmission in the unlicensed spectrum. For example, for a PRS transmission with a 100 MHz bandwidth, passing channel access may imply that a whole 100 MHz channel is idle. When an ongoing transmission occupies a portion of the 100 MHz channel (e.g., a 20 MHz bandwidth portion of the 100 MHz channel), this ongoing transmission may block channel access for the whole 100 MHz channel. As a result, the channel access for the sidelink PRS transmission may fail.

In various aspects of techniques and apparatuses described herein, a sidelink Tx UE may perform a sub-band channel access in candidate frequency resources of an unlicensed band for a sidelink PRS transmission to occur in time resources. The candidate frequency resources may be configured for the sidelink PRS transmission. The candidate frequency resources may correspond to an unlicensed bandwidth that is channelized to form a plurality of sub-bands. The sidelink Tx UE may perform the sub-band channel access for each of the plurality of sub-bands. The sidelink Tx UE may transmit the sidelink PRS transmission in one or more sub-bands of the unlicensed band that have passed the sub-band channel access. In some aspects, the sidelink Tx UE may determine that the sub-band channel access is passed in at least K sub-bands of N sub-bands associated with the candidate frequency resources, and the sidelink Tx UE may perform the sidelink PRS transmission in the at least K sub-bands based at least in part on the sub-band channel access being passed in the at least K sub-bands of the N sub-bands associated with the candidate frequency resources. A sidelink Rx UE may receive the sidelink PRS transmission in the one or more sub-bands associated with candidate frequency resources and time resources. The sidelink Rx UE may perform positioning-related measurements based at least in part on an aggregation of the sidelink PRS transmission received in the one or more sub-bands.

In some aspects, "sidelink Tx UE" may be used interchangeably with "sidelink Tx mobile station" herein, and "sidelink Rx UE" may be used interchangeably with "sidelink Rx mobile station" herein.

In some aspects, the sidelink Tx UE may perform the sidelink PRS transmission. The sidelink Tx UE may identify candidate frequency resources that may be used for the sidelink PRS transmission. The sidelink Tx UE may determine time resources for the sidelink PRS transmission. The sidelink Tx UE may perform sub-band channel access, in the candidate frequency resources, for the sidelink PRS transmission in the time resources. The UE may transmit the sidelink PRS in sub-band(s) that have succeeded channel access. For example, the UE may perform the sidelink PRS transmission in multiple sub-bands that have passed channel access. In some aspects, the sidelink Tx UE may indicate whether/at which time/frequency resource(s) the sidelink Tx UE performed the sidelink PRS transmission, after a sidelink PRS transmission occasion.

In some aspects, the sidelink Rx UE may detect the sidelink PRS transmission. The sidelink Rx UE may detect the sidelink PRS transmission in the candidate frequency resources and in the time resources. When sidelink PRS transmissions have been detected in multiple sub-bands, the sidelink Rx UE may perform sidelink PRS aggregation for a positioning related measurement, such as ToA, AoA, and so on.

In some aspects, sub-band based PRS transmission and PRS aggregation may be used for sidelink PRS transmissions in the unlicensed band. The sub-band based PRS transmission and PRS aggregation may be used due to challenges involved with passing channel access for larger bandwidth sidelink PRS transmissions in the unlicensed spectrum. Sub-band based PRS transmissions may improve channel access probabilities for PRS transmissions. PRS transmission aggregation may ensure that sub-band based PRS transmissions achieve a similar accuracy as compared to wide band PRS transmissions.

Figure 3:
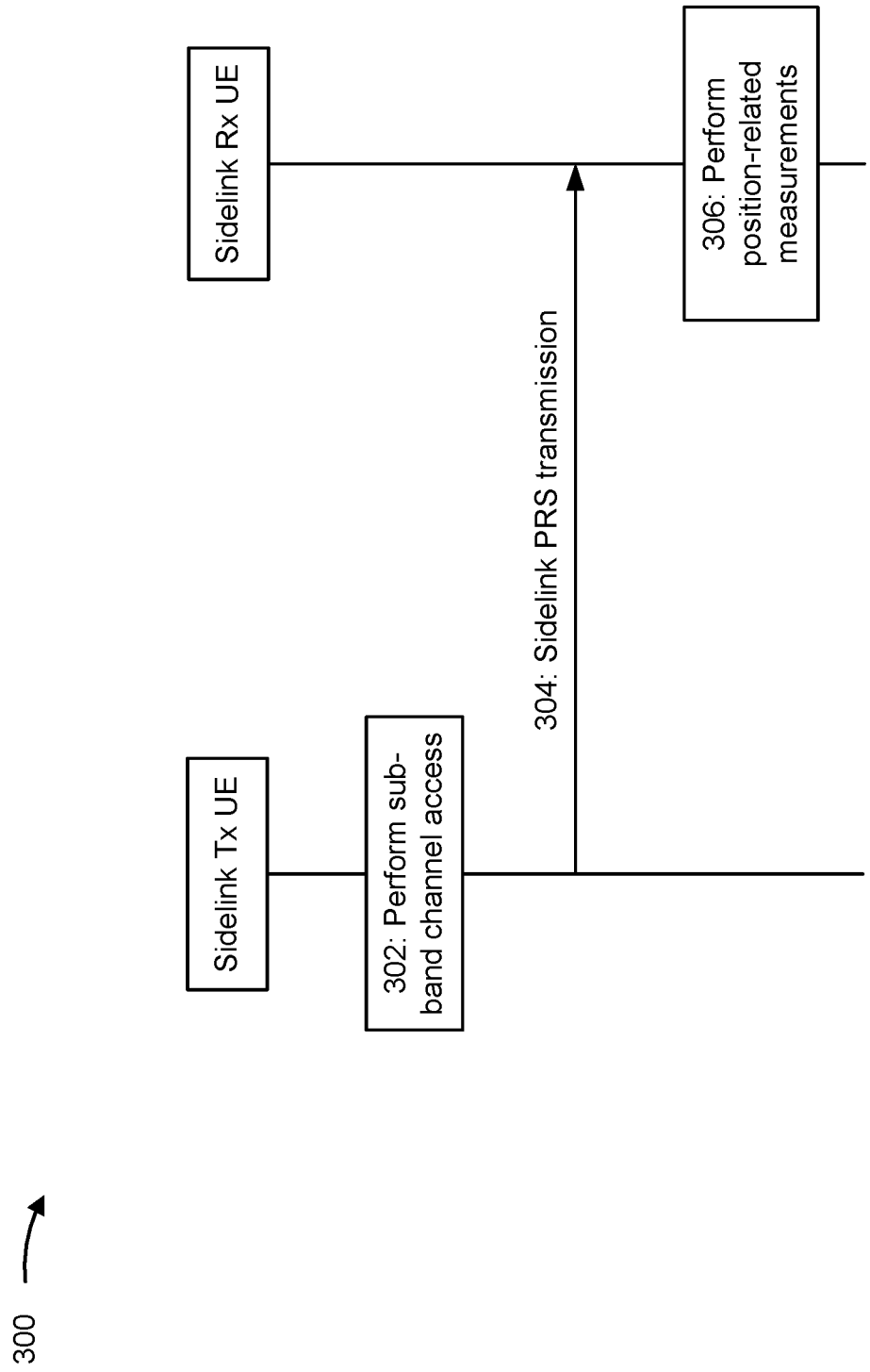
FIGS. 3-4 are diagrams illustrating examples associated with transmitting sidelink positioning reference signals (PRSs), in accordance with the present disclosure.

FIG. 3 is a diagram illustrating an example 300 of transmitting sidelink PRSs, in accordance with the present disclosure. As shown in FIG. 3, example 300 includes communication between a sidelink Tx UE (e.g., UE 120a) and a sidelink Rx UE (e.g., UE 120e). In some aspects, the sidelink Tx UE and the sidelink Rx UE may be included in a wireless network, such as wireless network 100.

As shown by reference number 302, the sidelink Tx UE (or sidelink Tx mobile station) may perform a sub-band channel access in candidate frequency resources of an unlicensed band for a sidelink PRS transmission to occur in time resources. The candidate frequency resources may be configured for the sidelink PRS transmission. The candidate frequency resources may correspond to an unlicensed bandwidth that is channelized to form a plurality of sub-bands. The sidelink Tx UE may perform the sub-band channel access for each of the plurality of sub-bands.

In some aspects, the sidelink Tx UE may determine the candidate frequency resources for the sidelink PRS transmission. The sidelink Tx UE may determine the time resources associated with the sidelink PRS transmission. Alternatively, the sidelink Tx mobile station may determine the time resources based at least in part on an indication received from another sidelink mobile station.

In some aspects, the candidate frequency resources may be (pre)-configured for the sidelink PRS transmission. For example, a 100 MHz bandwidth in an unlicensed spectrum may be (pre)-configured for sidelink PRS transmissions, and the 100 MHz bandwidth may be channelized to form five channels (or five sub-bands or five component carriers). In other words, a channel that is a portion of a larger bandwidth may also be referred to as a sub-band or a component carrier.

In some aspects, the sidelink Tx UE may determine the time resources for the sidelink PRS transmission. Alternatively, the time resources may be determined by another sidelink UE, and may be indicated to the sidelink Tx UE. The sidelink Tx UE may perform channel access for the sidelink PRS transmission. The UE may perform channel access in each sub-band. The channel access (or LBT) may be a Category 4 LBT (e.g., Type 1 channel access) or a Category 2 LBT (e.g., Type 2a/2b channel access).

In some aspects, the sidelink Tx UE may determine that the sub-band channel access is passed in at least K sub-bands of N sub-bands associated with the candidate frequency resources. The sidelink Tx UE may perform the sidelink PRS transmission in the at least K sub-bands based at least in part on the sub-band channel access being passed in the at least K sub-bands of the N sub-bands associated with the candidate frequency resources. In some aspects, the at least K sub-bands may be associated with contiguous sub-bands. In some aspects, the at least K sub-bands may be associated with non-contiguous sub-bands. In some aspects, adjacent sub-bands of the at least K sub-bands may be separated by a frequency that satisfies a threshold.

In some aspects, the sidelink Tx UE may re-perform the sub-band channel access within a sidelink PRS transmission occasion based at least in part on the sub-band channel access not being passed in the at least K sub-bands of the N sub-bands associated with the candidate frequency resources. The sidelink Tx UE may determine to abandon the sidelink PRS transmission based at least in part on: an expiration of a timer and the sub-band channel access not being passed in the at least K sub-bands of the N sub-bands associated with the candidate frequency resources.

In some aspects, the sidelink Tx UE may perform the sidelink PRS transmission after passing channel access. Specifically, the sidelink Tx UE may perform the sidelink PRS transmission when channel access is passed in the at least K of N channels, simultaneously. The sidelink Tx UE may perform channel access until channel access is passed in the at least K sub-bands, and then the sidelink Tx UE may perform the sidelink PRS transmission in each of the K sub-bands that have passed channel access. The sidelink Tx UE may perform the sidelink PRS transmission only in sub-bands that pass channel access. In some aspects, the K sub-bands may be contiguous. In some aspects, the K sub-bands may be non-contiguous. In some aspects, two adjacent sub-bands may be separated by a bandwidth that satisfies a threshold (e.g., the two adjacent sub-bands are relatively close to each other).

As an example, when N is five (e.g., five 20 MHz sub-bands in a 100 MHz channel), the sidelink Tx UE may perform a sidelink PRS transmission when channel access is passed in at least K=3 sub-bands.

In some aspects, when channel access is not passed in the at least K sub-bands, the sidelink Tx UE may keep attempting channel access within a sidelink PRS transmission occasion. In some aspects, the sidelink Tx UE may abandon a sidelink PRS transmission when channel access criteria is not satisfied within the sidelink PRS transmission occasion. A time window associated with the sidelink PRS transmission occasion may be enforced by a timer running at the sidelink Tx UE. When the timer expires and the sidelink Tx UE still cannot declare the channel access successful for the at least K sub-bands, the sidelink Tx UE may give up on the sidelink PRS transmission in this particular sidelink PRS transmission occasion.

In some aspects, sidelink PRS transmissions in each sub-band (or channel) may be independent. Alternatively, adjacent available sub-bands may be grouped together for sidelink PRS transmissions. In some aspects, sub-band based sidelink PRS transmissions may be subjected to relaxed conditions. For example, a simultaneous channel access success/PRS transmission may be relaxed to a channel access success/PRS transmission in a time window.

In some aspects, the sidelink PRS transmission may be associated with a time window to finish the sidelink PRS transmission. The sidelink PRS transmission may occur during a time window of a sidelink PRS transmission occasion. The time window to finish the sidelink PRS transmission may be less than the time window of the sidelink PRS transmission occasion.

In some aspects, the sidelink Tx UE may transmit a sidelink PRS in a sub-band (or channel) when channel access is passed in that sub-band. The sidelink Tx UE may, at a same time, attempt channel access in other sub-bands. The sidelink Tx UE may stop channel access attempts or sidelink PRS transmissions when the sidelink Tx UE has successfully transmitted a sidelink PRS in K out of N sub-bands (where K≤N), or when the sidelink Tx UE reaches an end of the time window. In some aspects, the time window may specify a time duration for which a radio channel remains coherent. The time window may start from a location at which a first sidelink PRS transmission occurs in the sidelink PRS transmission occasion based at least in part on a timer, and the time window may correspond to a duration in which the sidelink Tx UE is to finish the sidelink PRS transmission. The time window associated with finishing the sidelink PRS transmission may be different from (e.g., less than) the time window used to specify the sidelink PRS transmission occasion.

As shown by reference number 304, the sidelink Tx UE may transmit, to the sidelink Rx UE, the sidelink PRS transmission in one or more sub-bands of the unlicensed band that have passed the sub-band channel access. In some aspects, the sidelink Tx UE may transmit, to the sidelink Rx UE, an indication of time and frequency resources associated with the sidelink PRS transmission. The sidelink Tx UE may transmit the indication after a sidelink PRS transmission occasion.

As shown by reference number 306, the sidelink Rx UE may perform positioning-related measurements based at least in part on the sidelink PRS transmission. In some aspects, the sidelink Rx UE may perform the positioning-related measurements based at least in part on an aggregation of sidelink PRS transmissions received in multiple sub-bands. In some aspects, the sidelink Rx UE may detect the sidelink PRS transmission in each of the sub-bands. The sidelink Rx UE may detect sidelink PRSs independently in each sub-band when sidelink PRS transmissions are independent for each sub-band. When the sidelink transmission PRS is detected (e.g., sequence detection), the sidelink Rx UE may perform position related measurements. In other words, the sidelink Rx UE may perform the position related measurements based at least in part on the sidelink PRS transmission.

In some aspects, the sidelink Rx UE may receive signals in candidate sidelink PRS resources, and the sidelink Rx UE may buffer the signals. The sidelink Rx UE may perform positioning related measurements from buffered signals after receiving a sidelink PRS transmission confirmation from the sidelink Tx UE. For example, the sidelink Rx UE may receive a sidelink positioning assistant message after a sidelink PRS transmission, which may indicate a confirmation of the sidelink PRS transmission, and based at least in part on the confirmation, the sidelink Rx UE may perform the positioning related measurements from the buffered signals.

As indicated above, FIG. 3 is provided as an example. Other examples may differ from what is described with regard to FIG. 3.

Figure 4:
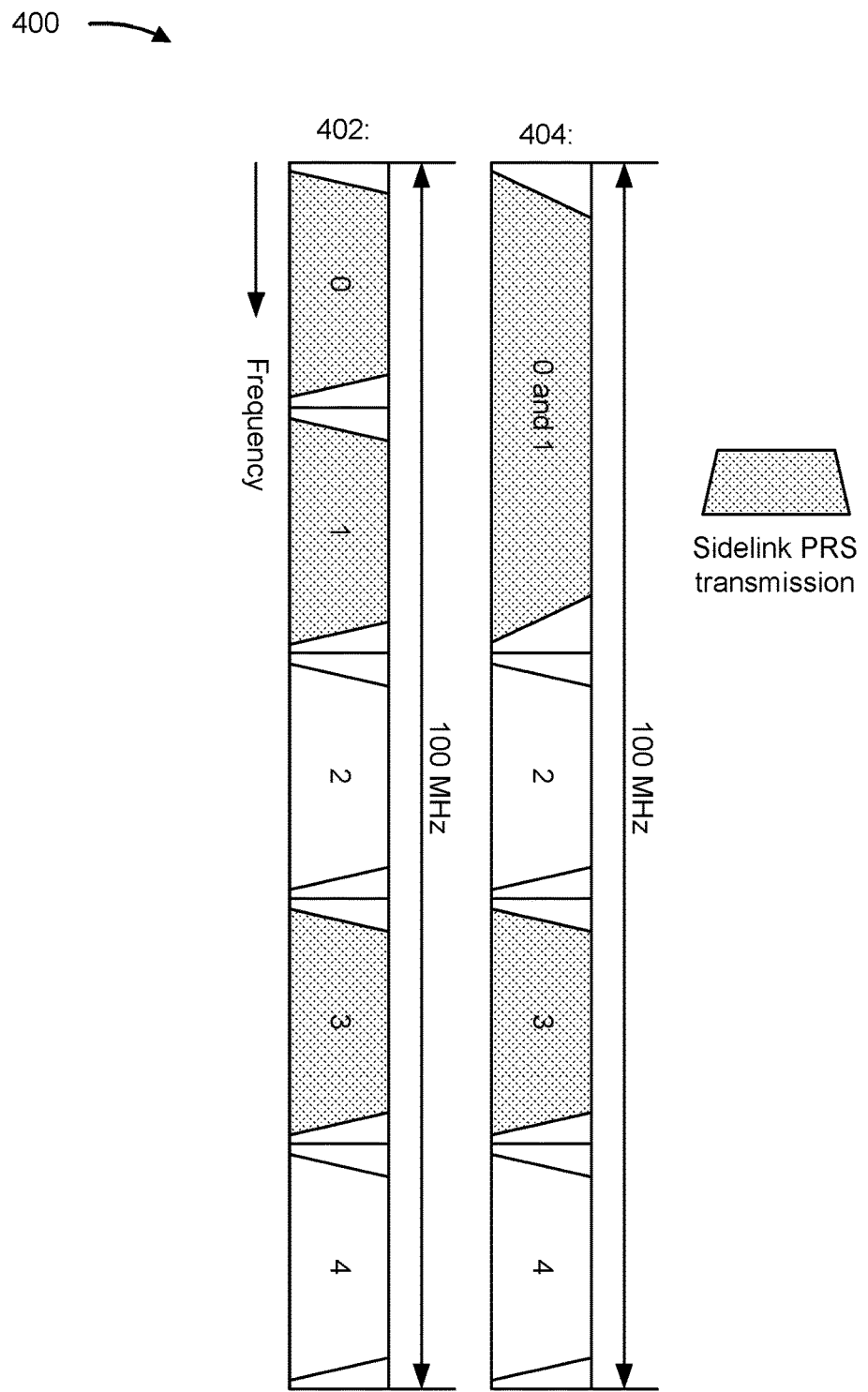

FIG. 4 is a diagram illustrating an example 400 of transmitting sidelink positioning reference signals (PRSs), in accordance with the present disclosure.

As shown by reference number 402, a frequency F may be equal to a 100 MHz bandwidth, which may be channelized to N sub-bands (or channels), where N is equal to five. Each sub-band (or channel) may be 20 MHz. A sidelink Tx UE may perform channel access until channel access is passed in at least K sub-bands, where K is equal to three. The sidelink Tx UE may perform the channel access for a sidelink PRS transmission in a time window, where K may be (pre)-configured. Each 20 MHz sub-band may have a separate channel access operation running. The sidelink Tx UE may transmit a sidelink PRS in one or more of the five 20 MHz sub-bands that have passed channel access. As an example, the sidelink Tx UE may transmit a sidelink PRS in a first sub-band (sub-band 0), a second sub-band (sub-band 1), and a fourth sub-band (sub-band 3) of the five 20 MHz sub-bands. The sidelink Tx UE may transmit the sidelink PRS in these three sub-bands after determining that channel access is successful in each of these three sub-bands, simultaneously.

As shown by reference number 404, a frequency F may be equal to a 100 MHz bandwidth, which may be channelized to N sub-bands (or channels), where N is equal to four. A first sub-band may be 40 MHz due to two adjacent sub-bands being grouped together. Three remaining sub-bands may each be 20 MHz. The sidelink Tx UE may transmit a sidelink PRS in the first sub-band (sub-band 0 and 1) and a fourth sub-band (sub-band 3) after determining that channel access is successful in each of these sub-bands, simultaneously.

As indicated above, FIG. 4 is provided as an example. Other examples may differ from what is described with regard to FIG. 4.

Figure 5:
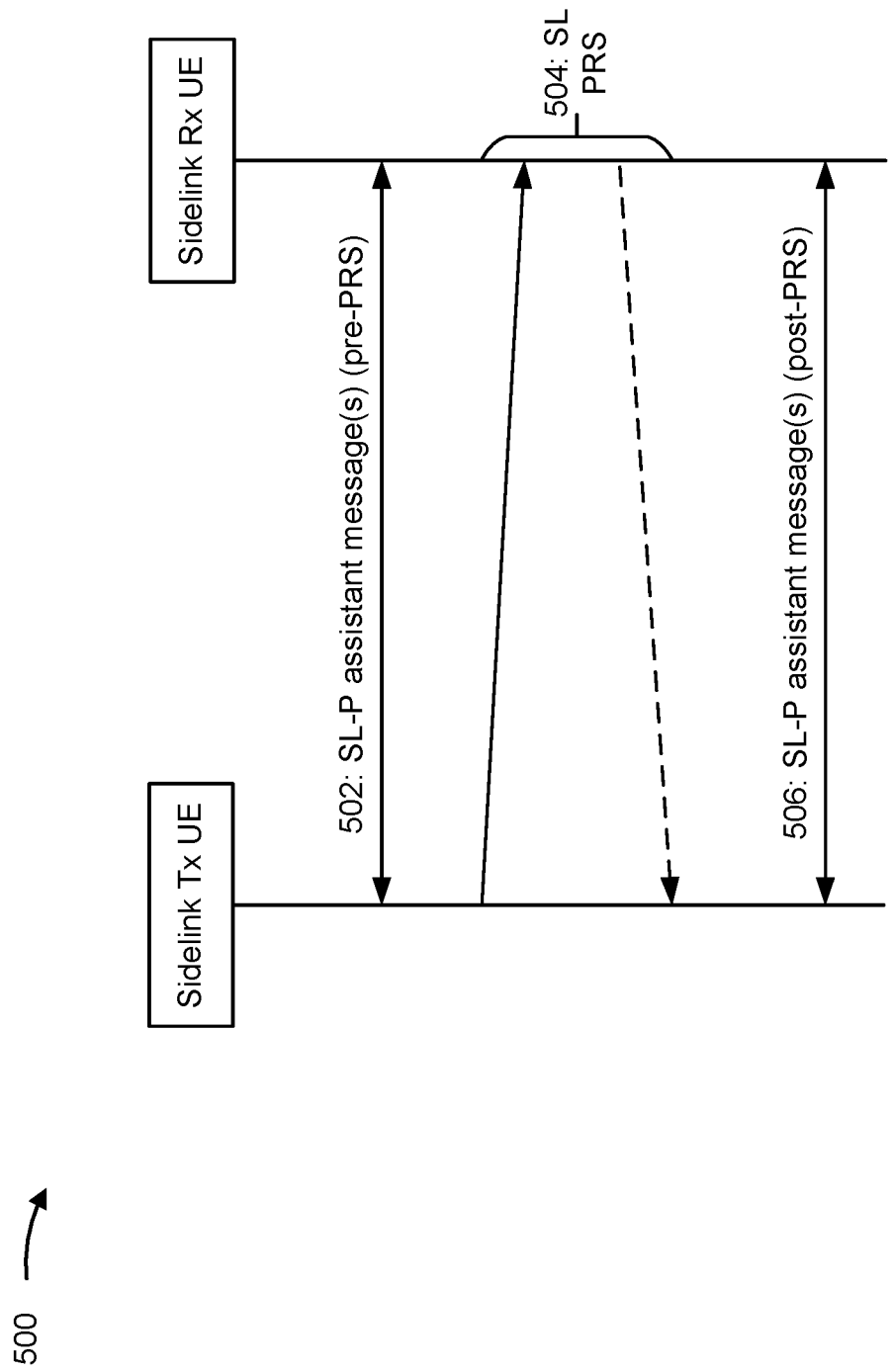
FIG. 5 is a diagram illustrating an example associated with transmitting sidelink positioning assistant messages, in accordance with the present disclosure.

FIG. 5 is a diagram illustrating an example 500 of transmitting sidelink positioning (SL-P) assistant messages, in accordance with the present disclosure. As shown in FIG. 5, example 500 includes communication between a sidelink Tx UE (e.g., UE 120a) and a sidelink Rx UE (e.g., UE 120e). In some aspects, the sidelink Tx UE and the sidelink Rx UE may be included in a wireless network, such as wireless network 100.

As shown by reference number 502, a sidelink positioning assistant message may be transmitted prior to a sidelink PRS transmission (e.g., pre-PRS) from the sidelink Tx UE. The sidelink positioning assistance message may be transmitted by the sidelink Tx UE and received by the sidelink Rx UE, or alternatively, the sidelink positioning assistance message may be transmitted by the sidelink Rx UE and received by the sidelink Tx UE. In some aspects, the sidelink positioning assistant message prior to the sidelink PRS transmission may indicate a sidelink PRS configuration. For example, the sidelink Tx UE may indicate the sidelink PRS configuration, which may indicate time and/or frequency resources in which the sidelink PRS transmission may occur. The sidelink positioning assistant message prior to the sidelink PRS transmission may be a pre-PRS message.

As shown by reference number 504, the sidelink Tx UE may transmit a sidelink PRS, and the sidelink Rx UE may detect the sidelink PRS. The sidelink Rx UE may transmit a response to the sidelink Tx UE based at least in part on the sidelink PRS.

As shown by reference number 506, a sidelink positioning assistant message may be transmitted after the sidelink PRS transmission (e.g., post-PRS). The sidelink positioning assistance message may be transmitted by the sidelink Tx UE and received by the sidelink Rx UE, or alternatively, the sidelink positioning assistance message may be transmitted by the sidelink Rx UE and received by the sidelink Tx UE. For example, the sidelink positioning assistant message after the sidelink PRS transmission may indicate measurements associated with the sidelink PRS transmission, such as ToA, AoA, and other related measurements based at least in part on the sidelink PRS transmission. The sidelink positioning assistant message after the sidelink PRS transmission may be a post-PRS message.

In some aspects, the sidelink Tx UE may transmit a sidelink positioning assistant message after the sidelink PRS transmission, which may indicate time and/or frequency resources associated with the sidelink PRS transmission. In other words, the sidelink positioning assistant message after the sidelink PRS transmission may indicate the time and/or frequency resources that the sidelink PRS transmission has taken place. As a result, the sidelink Rx UE receiving the sidelink PRS transmission may receive a confirmation of the sidelink PRS transmission. In some aspects, the sidelink positioning assistant message after the sidelink PRS transmission may indicate whether phase continuity has been maintained in the sidelink PRS transmission.

In some aspects, sidelink positioning assistant messages (pre-PRS and post-PRS) may be transmitted in a different frequency band (e.g., a licensed or ITS spectrum), as compared to the sidelink PRS transmission. For example, the sidelink Rx UE measuring a sidelink PRS from the sidelink Tx UE may receive an indication that the SL PRS has been transmitted in sub-band 0, sub-band 1, and sub-band 3 at time t.

As indicated above, FIG. 5 is provided as an example. Other examples may differ from what is described with regard to FIG. 5.

Figure 6:
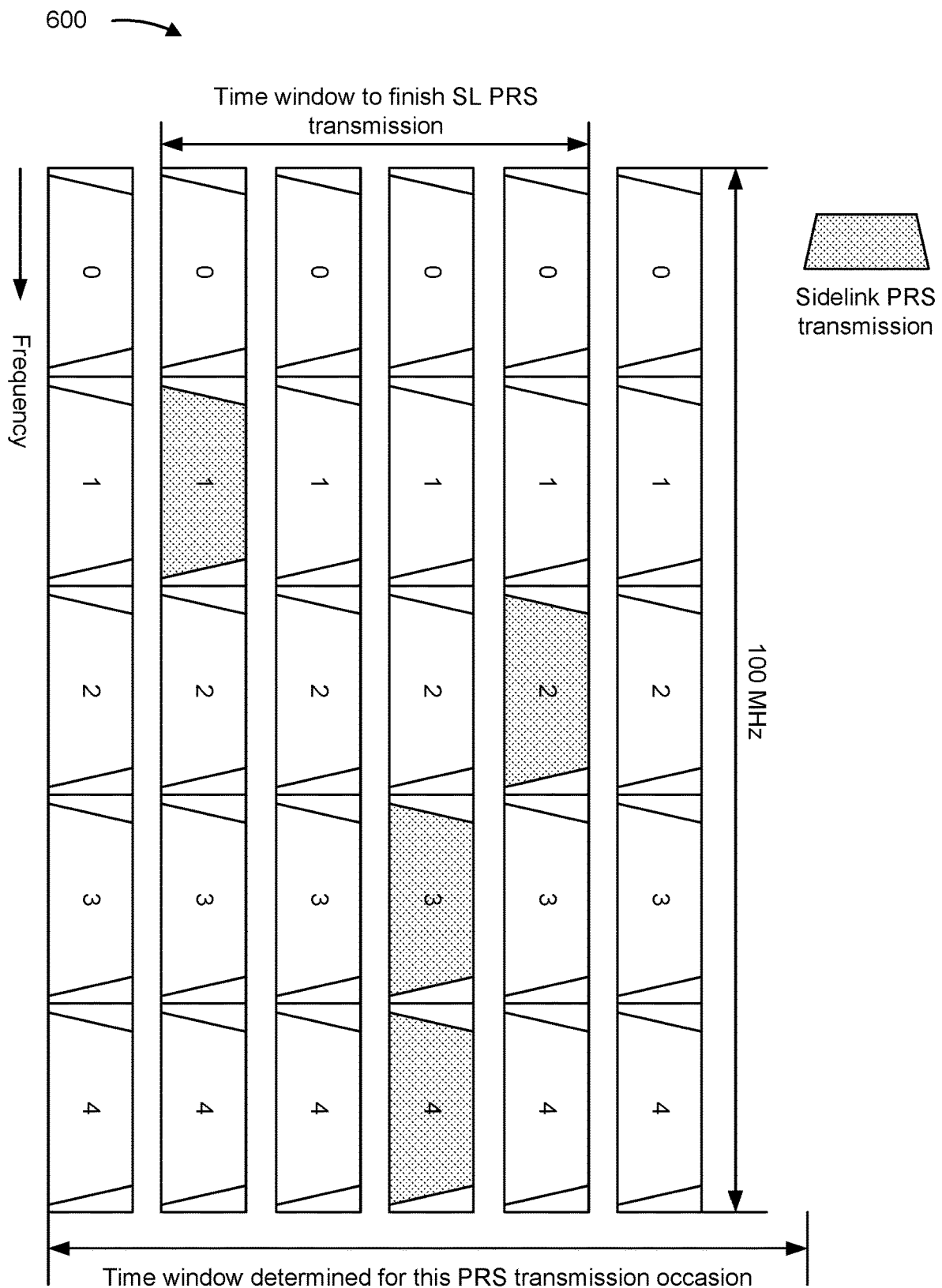
FIG. 6 is a diagram illustrating an example associated with performing sidelink PRS transmissions in a sidelink PRS transmission occasion, in accordance with the present disclosure.

FIG. 6 is a diagram illustrating an example 600 of performing sidelink PRS transmissions in a sidelink PRS transmission occasion, in accordance with the present disclosure.

As shown in FIG. 6, a sidelink Tx UE may perform channel access for sidelink PRS transmissions in the sidelink PRS transmission occasion (e.g., K is equal to five). The sidelink Tx UE may succeed channel access for the sidelink PRS transmission in sub-band 1 of a second sidelink PRS time resource (e.g., a second slot) of the sidelink PRS transmission occasion window. The sidelink Tx UE may transmit a sidelink PRS in channel 1, and at a same time, a time window to finish a sidelink PRS transmission starts (e.g., when enforced by a timer, the sidelink Tx UE may start the timer). In the fourth and fifth PRS time resources, the sidelink Tx UE may transmit the sidelink PRS in channels 3 and 4, and channel 2, respectively. A time duration to finish the sidelink PRS transmission may have a duration equal to four sidelink PRS time resources. In this example, the sidelink Tx UE may stop after transmitting the sidelink PRS in four sidelink PRS time resources due to an end of a time window corresponding to the sidelink PRS transmission occasion window. Separate time windows may exist for finishing the sidelink PRS transmission and the sidelink PRS transmission occasion.

In some aspects, a sidelink Rx UE may detect the sidelink PRS in the sidelink PRS transmission window. Alternatively, the sidelink Rx UE may buffer signals received during the sidelink PRS transmission window. The sidelink Rx UE may utilize the sidelink PRSs transmitted in different time/frequency resources according to a UE implementation. For example, the sidelink Rx UE may extrapolate channel frequency responses for different sub-bands, and then stitch the sidelink PRSs to obtain a wideband measurement. Alternatively, the sidelink Rx UE may process sidelink PRSs from each time resource separately.

As indicated above, FIG. 6 is provided as an example. Other examples may differ from what is described with regard to FIG. 6.

Figure 7:
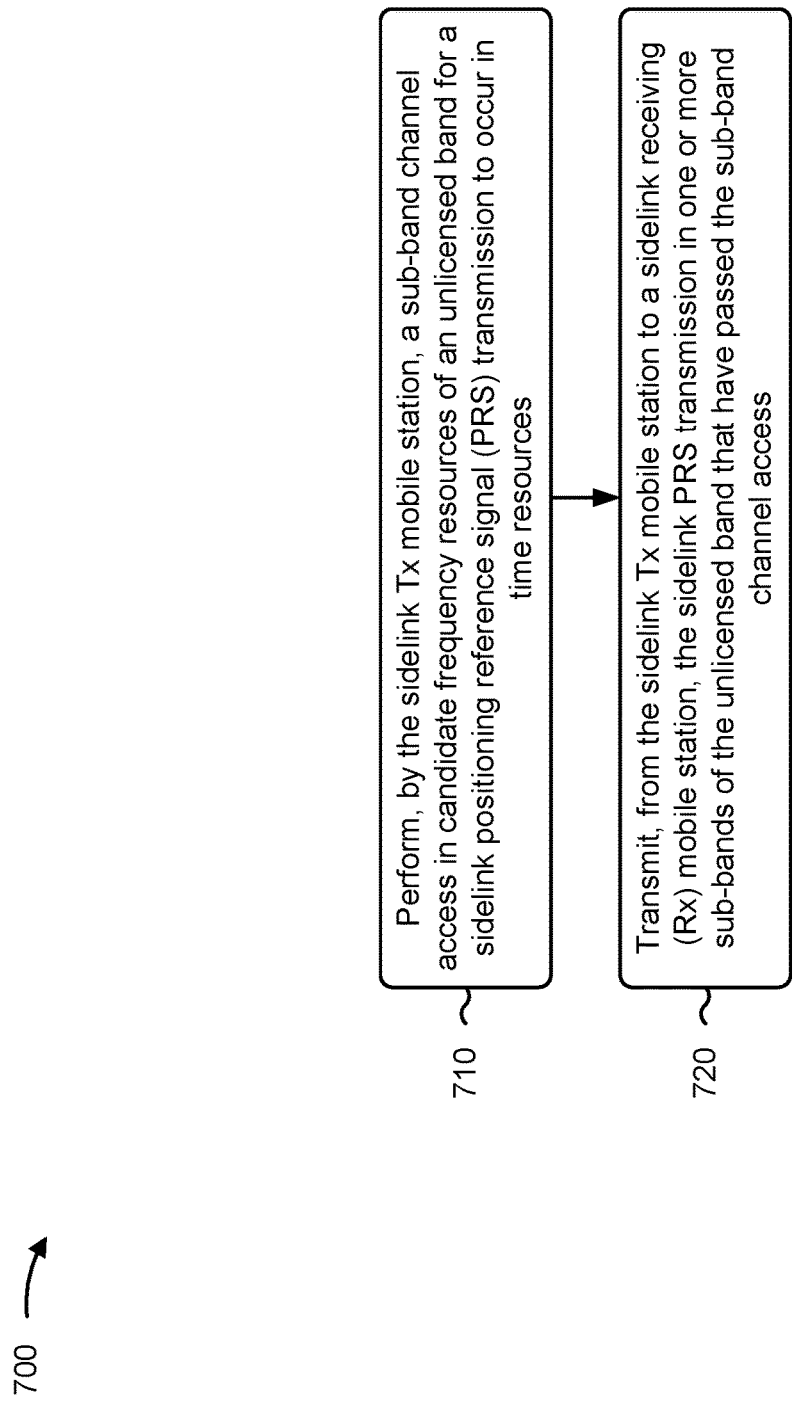
FIGS. 7-8 are diagrams illustrating example processes associated with sidelink PRS transmissions, in accordance with the present disclosure.

FIG. 7 is a diagram illustrating an example process 700 performed, for example, by a sidelink Tx mobile station, in accordance with the present disclosure. Example process 700 is an example where the sidelink Tx mobile station (e.g., UE 120a) performs operations associated with sidelink PRS transmissions.

As shown in FIG. 7, in some aspects, process 700 may include performing a sub-band channel access in candidate frequency resources of an unlicensed band for a sidelink PRS transmission to occur in time resources (block 710). For example, the sidelink Tx mobile station (e.g., using communication manager 140 and/or performance component 908, depicted in FIG. 9) may perform a sub-band channel access in candidate frequency resources of an unlicensed band for a sidelink PRS transmission to occur in time resources, as described above.

As further shown in FIG. 7, in some aspects, process 700 may include transmitting, from the sidelink Tx mobile station to a sidelink Rx mobile station, the sidelink PRS transmission in one or more sub-bands of the unlicensed band that have passed the sub-band channel access (block 720). For example, the sidelink Tx mobile station (e.g., using communication manager 140 and/or transmission component 904, depicted in FIG. 9) may transmit, from the sidelink Tx mobile station to a sidelink Rx mobile station, the sidelink PRS transmission in one or more sub-bands of the unlicensed band that have passed the sub-band channel access, as described above.

Process 700 may include additional aspects, such as any single aspect or any combination of aspects described below and/or in connection with one or more other processes described elsewhere herein.

In a first aspect, process 700 includes transmitting, from the sidelink Tx mobile station to the sidelink Rx mobile station and after a sidelink PRS transmission occasion, an indication of time and frequency resources associated with the sidelink PRS transmission.

In a second aspect, alone or in combination with the first aspect, the candidate frequency resources are configured for the sidelink PRS transmission, wherein the candidate frequency resources correspond to an unlicensed bandwidth that is channelized to form a plurality of sub-bands, and the sub-band channel access is performed for each of the plurality of sub-bands.

In a third aspect, alone or in combination with one or more of the first and second aspects, process 700 includes determining, at the sidelink Tx mobile station, the candidate frequency resources for the sidelink PRS transmission, and determining the time resources associated with the sidelink PRS transmission at the sidelink Tx mobile station or determining the time resources based at least in part on an indication received from another sidelink mobile station.

In a fourth aspect, alone or in combination with one or more of the first through third aspects, process 700 includes determining, at the sidelink Tx mobile station, that the sub-band channel access is passed in at least K sub-bands of N sub-bands associated with the candidate frequency resources, and the sidelink PRS transmission is transmitted in the at least K sub-bands based at least in part on the sub-band channel access being passed in the at least K sub-bands of the N sub-bands associated with the candidate frequency resources.

In a fifth aspect, alone or in combination with one or more of the first through fourth aspects, the at least K sub-bands are associated with contiguous sub-bands, or adjacent sub-bands of the at least K sub-bands are separated by a frequency that satisfies a threshold.

In a sixth aspect, alone or in combination with one or more of the first through fifth aspects, process 700 includes re-performing the sub-band channel access within a sidelink PRS transmission occasion based at least in part on the sub-band channel access not being passed in the at least K sub-bands of the N sub-bands associated with the candidate frequency resources, and determining to abandon the sidelink PRS transmission based at least in part on an expiration of a timer and the sub-band channel access not being passed in the at least K sub-bands of the N sub-bands associated with the candidate frequency resources.

In a seventh aspect, alone or in combination with one or more of the first through sixth aspects, process 700 includes transmitting, from the sidelink Tx mobile station to the sidelink Rx mobile station, a sidelink positioning assistance message prior to the sidelink PRS transmission or a sidelink positioning assistance message after the sidelink PRS transmission, or receiving, at the sidelink Tx mobile station from the sidelink Rx mobile station, the sidelink positioning assistance message prior to the sidelink PRS transmission or the sidelink positioning assistance message after the sidelink PRS transmission, wherein the sidelink positioning assistance message is associated with a different frequency band as compared to the sidelink PRS transmission.

In an eighth aspect, alone or in combination with one or more of the first through seventh aspects, the sidelink positioning assistance message prior to the sidelink PRS transmission, as transmitted to the sidelink Rx mobile station, indicates a sidelink PRS configuration, wherein the sidelink PRS configuration indicates the candidate frequency resources and the time resources associated with the sidelink PRS transmission.

In a ninth aspect, alone or in combination with one or more of the first through eighth aspects, the sidelink positioning assistance message after the sidelink PRS transmission, as received from the sidelink Rx mobile station, indicates measurements associated with the sidelink PRS transmission.

In a tenth aspect, alone or in combination with one or more of the first through ninth aspects, the sidelink positioning assistance message after the sidelink PRS transmission indicates time and frequency resources associated with the sidelink PRS transmission, or the sidelink positioning assistance message after the sidelink PRS transmission indicates whether a phase continuity has been maintained for the sidelink PRS transmission.

In an eleventh aspect, alone or in combination with one or more of the first through tenth aspects, the sidelink PRS transmission is associated with a time window to finish the sidelink PRS transmission, wherein the sidelink PRS transmission occurs during a time window of a sidelink PRS transmission occasion, and the time window to finish the sidelink PRS transmission is less than the time window of the sidelink PRS transmission occasion.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
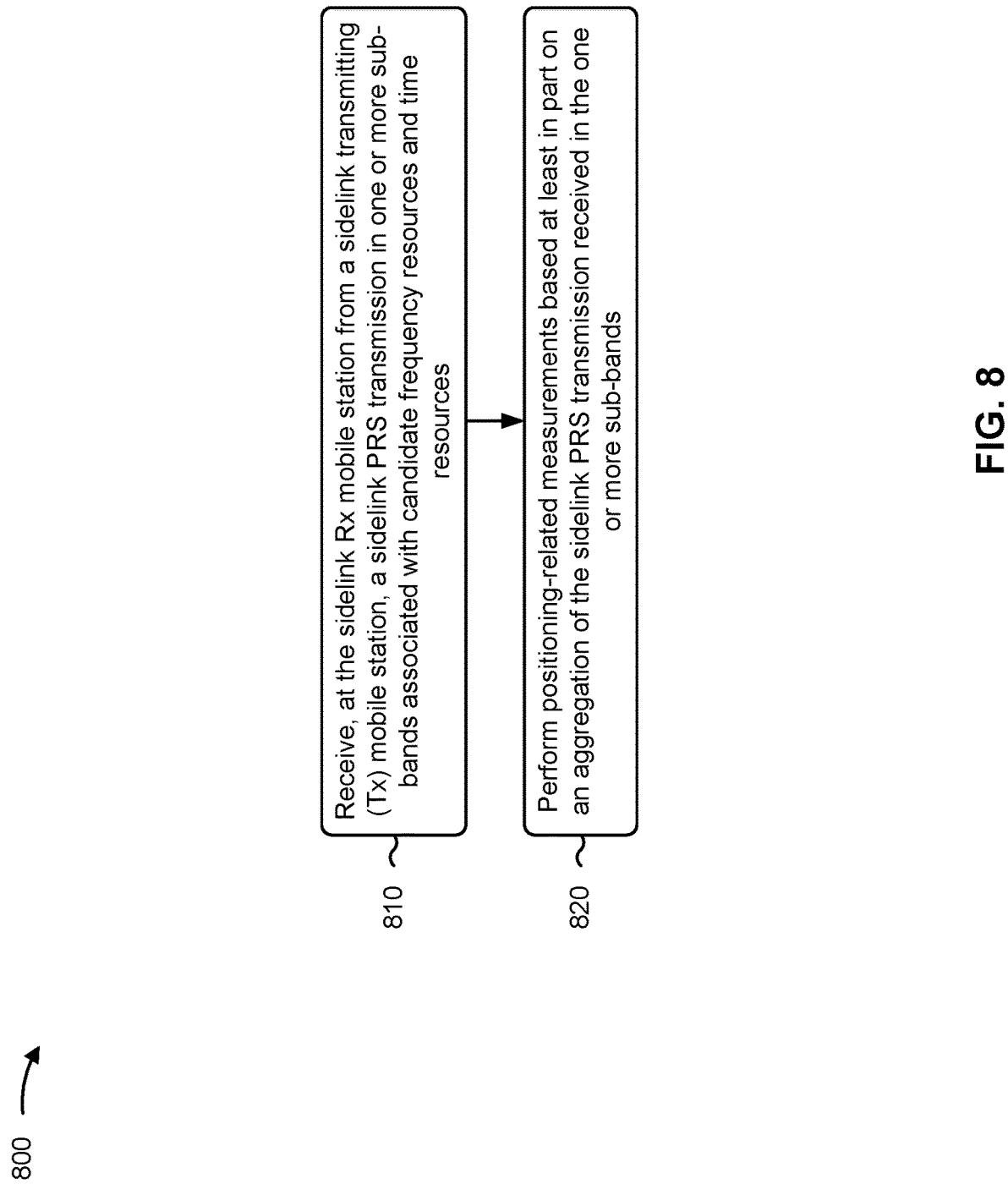

FIG. 8 is a diagram illustrating an example process 800 performed, for example, by a sidelink Rx mobile station, in accordance with the present disclosure. Example process 800 is an example where the sidelink Rx mobile station (e.g., UE 120*e*) performs operations associated with sidelink PRS transmissions.

As shown in FIG. 8, in some aspects, process 800 may include receiving, at the sidelink Rx mobile station from a sidelink Tx mobile station, a sidelink PRS transmission in one or more sub-bands associated with candidate frequency resources and time resources (block 810). For example, the sidelink Rx mobile station (e.g., using communication manager 150 and/or reception component 1002, depicted in FIG. 10) may receive, at the sidelink Rx mobile station from a sidelink Tx mobile station, a sidelink PRS transmission in one or more sub-bands associated with candidate frequency resources and time resources, as described above.

As further shown in FIG. 8, in some aspects, process 800 may include performing positioning-related measurements based at least in part on an aggregation of the sidelink PRS transmission received in the one or more sub-bands (block 820). For example, the sidelink Rx mobile station (e.g., using communication manager 150 and/or performance component 1008, depicted in FIG. 10) may perform positioning-related measurements based at least in part on an aggregation of the sidelink PRS transmission received in the one or more sub-bands, as described above.

Process 800 may include additional aspects, such as any single aspect or any combination of aspects described below and/or in connection with one or more other processes described elsewhere herein.

In a first aspect, process 800 includes transmitting, from the sidelink Tx mobile station to the sidelink Rx mobile station and after a sidelink PRS transmission occasion, an indication of time and frequency resources associated with the sidelink PRS transmission.

In a second aspect, alone or in combination with the first aspect, process 800 includes transmitting, from the sidelink Rx mobile station to the sidelink Tx mobile station, a sidelink positioning assistance message prior to the sidelink PRS transmission or a sidelink positioning assistance message after the sidelink PRS transmission, or receiving, at the sidelink Rx mobile station from the sidelink Tx mobile station, the sidelink positioning assistance message prior to the sidelink PRS transmission or the sidelink positioning assistance message after the sidelink PRS transmission, wherein the sidelink positioning assistance message is associated with a different frequency band as compared to the sidelink PRS transmission.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
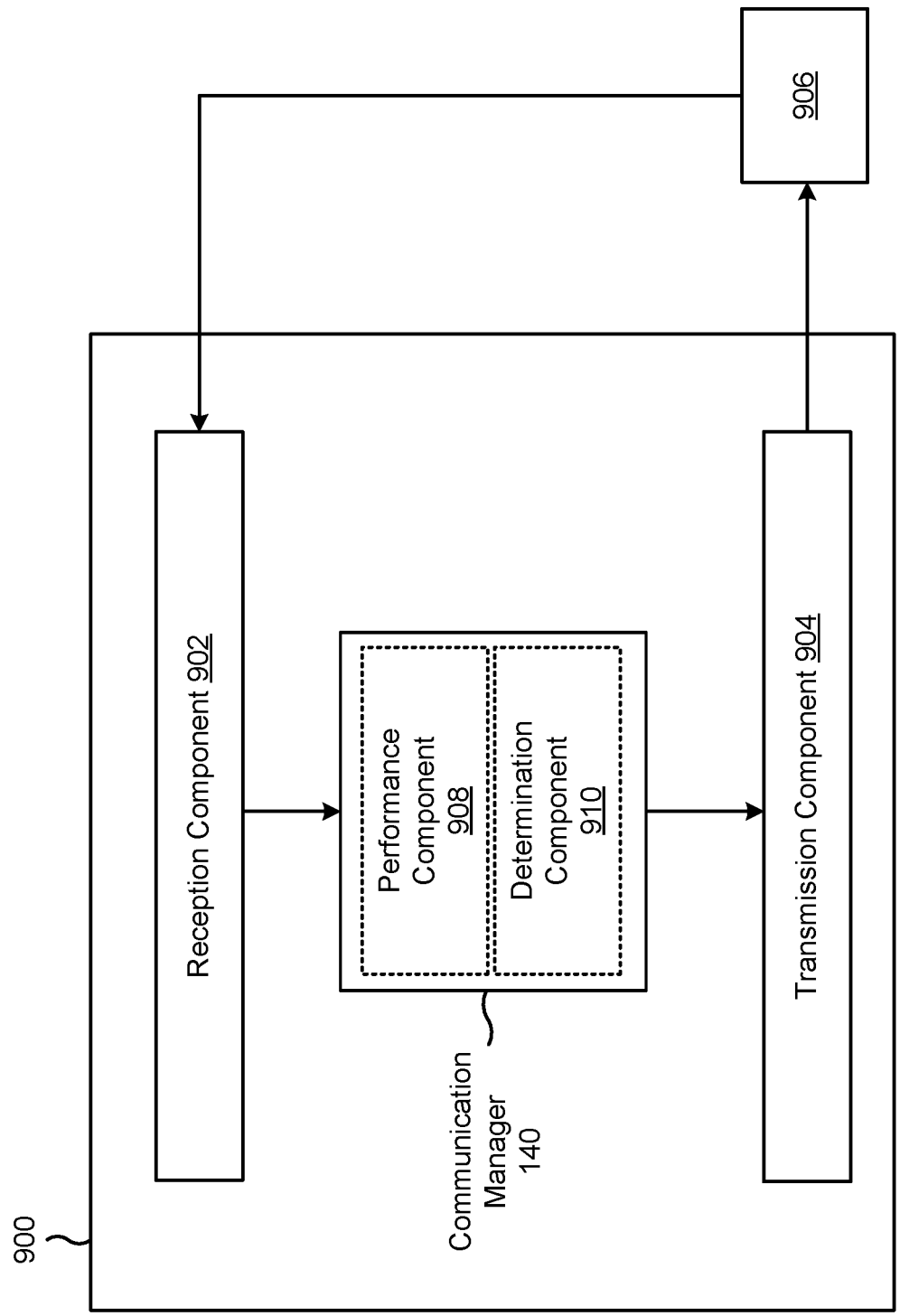
FIGS. 9-10 are diagrams of example apparatuses for wireless communication, in accordance with the present disclosure.

FIG. 9 is a diagram of an example apparatus 900 for wireless communication. The apparatus 900 may be a sidelink Tx mobile station, or a sidelink Tx mobile station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140) may include one or more of a performance component 908 or a determination component 910, among other examples.

In some aspects, the apparatus 900 may be configured to perform one or more operations described herein in connection with FIGS. 3-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the sidelink Tx mobile station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the sidelink Tx mobile station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the sidelink Tx mobile station described in connection with FIG. 2. In some aspects, the transmission component 904 may be co-located with the reception component 902 in a transceiver.

The performance component 908 may perform a sub-band channel access in candidate frequency resources of an unlicensed band for a sidelink PRS transmission to occur in time resources. The transmission component 904 may transmit, from the sidelink Tx mobile station to a sidelink Rx mobile station, the sidelink PRS transmission in one or more sub-bands of the unlicensed band that have passed the sub-band channel access.

The transmission component 904 may transmit, from the sidelink Tx mobile station to the sidelink Rx mobile station and after a sidelink PRS transmission occasion, an indication of time and frequency resources associated with the sidelink PRS transmission. The determination component 910 may determine, at the sidelink Tx mobile station, the candidate frequency resources for the sidelink PRS transmission. The determination component 910 may determine the time resources associated with the sidelink PRS transmission at the sidelink Tx mobile station or determining the time resources based at least in part on an indication received from another sidelink mobile station. The determination component 910 may determine, at the sidelink Tx mobile station, that the sub-band channel access is passed in at least K sub-bands of N sub-bands associated with the candidate frequency resources, wherein the sidelink PRS transmission is transmitted in the at least K sub-bands based at least in part on the sub-band channel access being passed in the at least K sub-bands of the N sub-bands associated with the candidate frequency resources.

The performance component 908 may re-perform the sub-band channel access within a sidelink PRS transmission occasion based at least in part on the sub-band channel access not being passed in the at least K sub-bands of the N sub-bands associated with the candidate frequency resources. The determination component 910 may determine to abandon the sidelink PRS transmission based at least in part on: an expiration of a timer and the sub-band channel access not being passed in the at least K sub-bands of the N sub-bands associated with the candidate frequency resources.

The transmission component 904 may transmit, from the sidelink Tx mobile station to the sidelink Rx mobile station, a sidelink positioning assistance message prior to the sidelink PRS transmission or a sidelink positioning assistance message after the sidelink PRS transmission. The reception component 902 may receive, at the sidelink Tx mobile station from the sidelink Rx mobile station, the sidelink positioning assistance message prior to the sidelink PRS transmission or the sidelink positioning assistance message after the sidelink PRS transmission.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
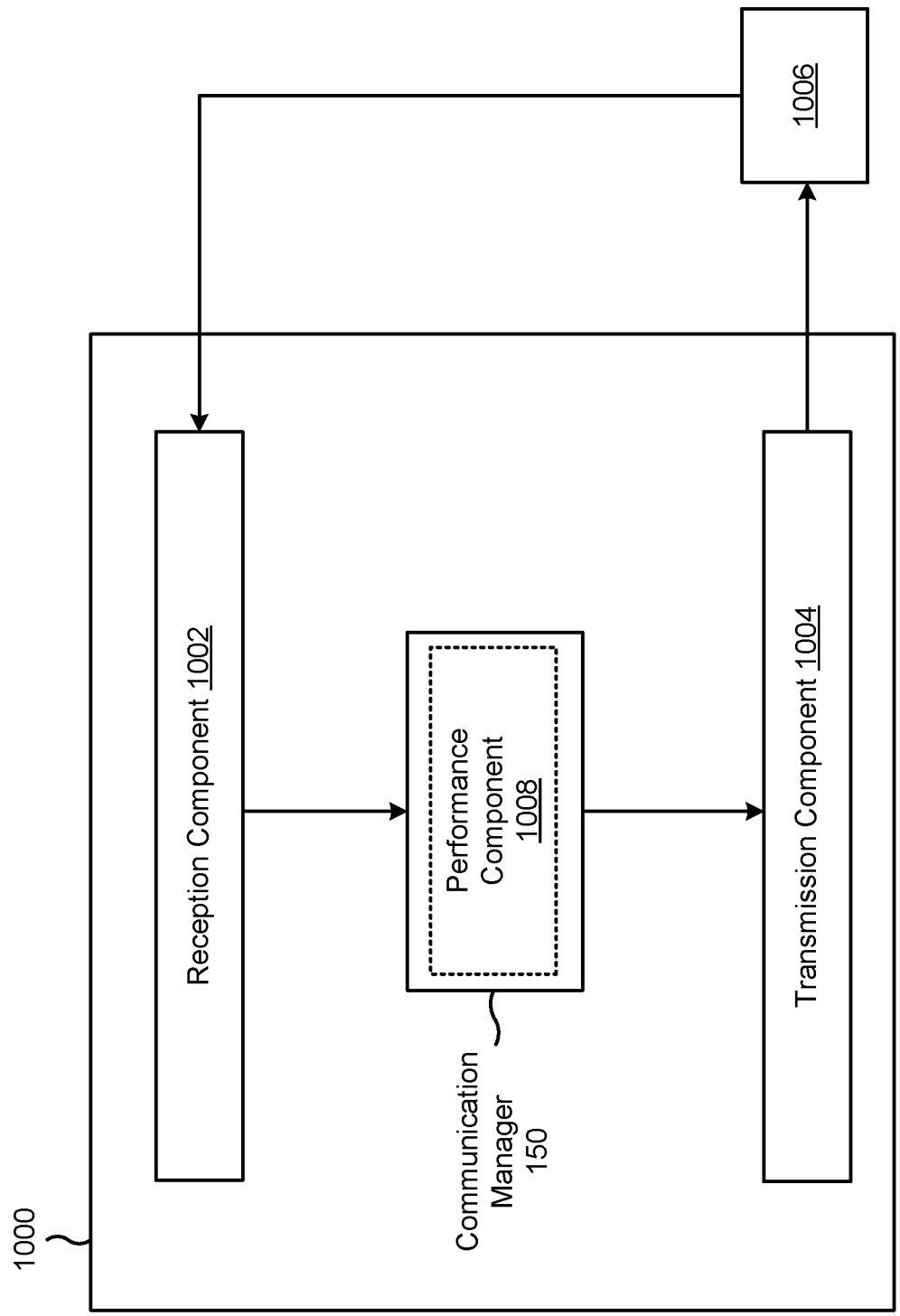

FIG. 10 is a diagram of an example apparatus 1000 for wireless communication. The apparatus 1000 may be a sidelink Rx mobile station, or a sidelink Rx mobile station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150) may include a performance component 1008, among other examples.

In some aspects, the apparatus 1000 may be configured to perform one or more operations described herein in connection with FIGS. 3-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the sidelink Rx mobile station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the sidelink Rx mobile station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the sidelink Rx mobile station described in connection with FIG. 2. In some aspects, the transmission component 1004 may be co-located with the reception component 1002 in a transceiver.

The reception component 1002 may receive, at the sidelink Rx mobile station from a sidelink Tx mobile station, a sidelink PRS transmission in one or more sub-bands associated with candidate frequency resources and time resources. The performance component 1008 may perform positioning-related measurements based at least in part on an aggregation of the sidelink PRS transmission received in the one or more sub-bands.

The transmission component 1004 may transmit, from the sidelink Tx mobile station to the sidelink Rx mobile station and after a sidelink PRS transmission occasion, an indication of time and frequency resources associated with the sidelink PRS transmission. The transmission component 1004 may transmit, from the sidelink Rx mobile station to the sidelink Tx mobile station, a sidelink positioning assistance message prior to the sidelink PRS transmission or a sidelink positioning assistance message after the sidelink PRS transmission. The reception component 1002 may receive, at the sidelink Rx mobile station from the sidelink Tx mobile station, the sidelink positioning assistance message prior to the sidelink PRS transmission or the sidelink positioning assistance message after the sidelink PRS transmission.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a sidelink transmitting (Tx) mobile station, comprising: performing, by the sidelink Tx mobile station, a sub-band channel access in candidate frequency resources of an unlicensed band for a sidelink positioning reference signal (PRS) transmission to occur in time resources; and transmitting, from the sidelink Tx mobile station to a sidelink receiving (Rx) mobile station, the sidelink PRS transmission in one or more sub-bands of the unlicensed band that have passed the sub-band channel access.

Aspect 2: The method of Aspect 1, further comprising: transmitting, from the sidelink Tx mobile station to the sidelink Rx mobile station and after a sidelink PRS transmission occasion, an indication of time and frequency resources associated with the sidelink PRS transmission.

Aspect 3: The method of any of Aspects 1 through 2, wherein the candidate frequency resources are configured for the sidelink PRS transmission, wherein the candidate frequency resources correspond to an unlicensed bandwidth that is channelized to form a plurality of sub-bands, and wherein the sub-band channel access is performed for each of the plurality of sub-bands.

Aspect 4: The method of any of Aspects 1 through 3, further comprising: determining, at the sidelink Tx mobile station, the candidate frequency resources for the sidelink PRS transmission; and determining the time resources associated with the sidelink PRS transmission at the sidelink Tx mobile station or determining the time resources based at least in part on an indication received from another sidelink mobile station.

Aspect 5: The method of any of Aspects 1 through 4, further comprising: determining, at the sidelink Tx mobile station, that the sub-band channel access is passed in at least K sub-bands of N sub-bands associated with the candidate frequency resources, wherein the sidelink PRS transmission is transmitted in the at least K sub-bands based at least in part on the sub-band channel access being passed in the at least K sub-bands of the N sub-bands associated with the candidate frequency resources.

Aspect 6: The method of Aspect 5, wherein: the at least K sub-bands are associated with contiguous sub-bands; or adjacent sub-bands of the at least K sub-bands are separated by a frequency that satisfies a threshold.

Aspect 7: The method of Aspect 5, further comprising: re-performing the sub-band channel access within a sidelink PRS transmission occasion based at least in part on the sub-band channel access not being passed in the at least K sub-bands of the N sub-bands associated with the candidate frequency resources; and determining to abandon the sidelink PRS transmission based at least in part on: an expiration of a timer and the sub-band channel access not being passed in the at least K sub-bands of the N sub-bands associated with the candidate frequency resources.

Aspect 8: The method of any of Aspects 1 through 7, further comprising: transmitting, from the sidelink Tx mobile station to the sidelink Rx mobile station, a sidelink positioning assistance message prior to the sidelink PRS transmission or a sidelink positioning assistance message after the sidelink PRS transmission; or receiving, at the sidelink Tx mobile station from the sidelink Rx mobile station, the sidelink positioning assistance message prior to the sidelink PRS transmission or the sidelink positioning assistance message after the sidelink PRS transmission, wherein the sidelink positioning assistance message is associated with a different frequency band as compared to the sidelink PRS transmission.

Aspect 9: The method of Aspect 8, wherein the sidelink positioning assistance message prior to the sidelink PRS transmission, as transmitted to the sidelink Rx mobile station, indicates a sidelink PRS configuration, wherein the sidelink PRS configuration indicates the candidate frequency resources and the time resources associated with the sidelink PRS transmission.

Aspect 10: The method of Aspect 8, wherein the sidelink positioning assistance message after the sidelink PRS transmission, as received from the sidelink Rx mobile station, indicates measurements associated with the sidelink PRS transmission.

Aspect 11: The method of Aspect 8, wherein: the sidelink positioning assistance message after the sidelink PRS transmission indicates time and frequency resources associated with the sidelink PRS transmission; or the sidelink positioning assistance message after the sidelink PRS transmission indicates whether a phase continuity has been maintained for the sidelink PRS transmission.

Aspect 12: The method of any of Aspects 1 through 11, wherein the sidelink PRS transmission is associated with a time window to finish the sidelink PRS transmission, wherein the sidelink PRS transmission occurs during a time window of a sidelink PRS transmission occasion, and wherein the time window to finish the sidelink PRS transmission is less than the time window of the sidelink PRS transmission occasion.

Aspect 13: A method of wireless communication performed by a sidelink receiving (Rx) mobile station, comprising: receiving, at the sidelink Rx mobile station from a sidelink transmitting (Tx) mobile station, a sidelink positioning reference signal (PRS) transmission in one or more sub-bands associated with candidate frequency resources and time resources; and performing positioning-related measurements based at least in part on an aggregation of the sidelink PRS transmission received in the one or more sub-bands.

Aspect 14: The method of Aspect 13, further comprising: transmitting, from the sidelink Tx mobile station to the sidelink Rx mobile station and after a sidelink PRS transmission occasion, an indication of time and frequency resources associated with the sidelink PRS transmission.

Aspect 15: The method of any of Aspects 13 through 14, further comprising: transmitting, from the sidelink Rx mobile station to the sidelink Tx mobile station, a sidelink positioning assistance message prior to the sidelink PRS transmission or a sidelink positioning assistance message after the sidelink PRS transmission; or receiving, at the sidelink Rx mobile station from the sidelink Tx mobile station, the sidelink positioning assistance message prior to the sidelink PRS transmission or the sidelink positioning assistance message after the sidelink PRS transmission, wherein the sidelink positioning assistance message is associated with a different frequency band as compared to the sidelink PRS transmission.

Aspect 16: An apparatus for wireless communication at a device, comprising a processor; memory coupled with the processor; and instructions stored in the memory and executable by the processor to cause the apparatus to perform the method of one or more of Aspects 1-12.

Aspect 17: A device for wireless communication, comprising a memory and one or more processors coupled to the memory, the one or more processors configured to perform the method of one or more of Aspects 1-12.

Aspect 18: An apparatus for wireless communication, comprising at least one means for performing the method of one or more of Aspects 1-12.

Aspect 19: A non-transitory computer-readable medium storing code for wireless communication, the code comprising instructions executable by a processor to perform the method of one or more of Aspects 1-12.

Aspect 20: A non-transitory computer-readable medium storing a set of instructions for wireless communication, the set of instructions comprising one or more instructions that, when executed by one or more processors of a device, cause the device to perform the method of one or more of Aspects 1-12.

Aspect 21: An apparatus for wireless communication at a device, comprising a processor; memory coupled with the processor; and instructions stored in the memory and executable by the processor to cause the apparatus to perform the method of one or more of Aspects 13-15.

Aspect 22: A device for wireless communication, comprising a memory and one or more processors coupled to the memory, the one or more processors configured to perform the method of one or more of Aspects 13-15.

Aspect 23: An apparatus for wireless communication, comprising at least one means for performing the method of one or more of Aspects 13-15.

Aspect 24: A non-transitory computer-readable medium storing code for wireless communication, the code comprising instructions executable by a processor to perform the method of one or more of Aspects 13-15.

Aspect 25: A non-transitory computer-readable medium storing a set of instructions for wireless communication, the set of instructions comprising one or more instructions that, when executed by one or more processors of a device, cause the device to perform the method of one or more of Aspects 13-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a sidelink transmitting (Tx) mobile station, comprising:
   one or more memories; and
   one or more processors, based at least in part on information stored in the one or more memories, configured to:
      perform a sub-band channel access in candidate frequency resources of an unlicensed band for a sidelink positioning reference signal (PRS) transmission to occur in time resources, wherein performing the sub-band channel access includes performing sensing for a presence of other transmissions; and
      transmit, from the sidelink Tx mobile station to a sidelink receiving (Rx) mobile station, the sidelink PRS transmission for positioning-related measurements that use an aggregation of the sidelink PRS transmission from one or more sub-bands of the unlicensed band,
         wherein the sidelink PRS transmission is transmitted in the one or more sub-bands in association with the one or more sub-bands passing the sub-band channel access.

2. The apparatus of claim 1, wherein the one or more processors are further configured to:
   transmit, from the sidelink Tx mobile station to the sidelink Rx mobile station and after a sidelink PRS transmission occasion, an indication of time and frequency resources associated with the sidelink PRS transmission.

3. The apparatus of claim 1, wherein the candidate frequency resources are configured for the sidelink PRS transmission, wherein the candidate frequency resources correspond to an unlicensed bandwidth that is channelized to form a plurality of sub-bands, and wherein the sub-band channel access is performed for each of the plurality of sub-bands.

4. The apparatus of claim 1, wherein the one or more processors are further configured to:
   determine, at the sidelink Tx mobile station, the candidate frequency resources for the sidelink PRS transmission; and
   determine the time resources associated with the sidelink PRS transmission at the sidelink Tx mobile station or determine the time resources based at least in part on an indication received from another sidelink mobile station.

5. The apparatus of claim 1, wherein the one or more processors are further configured to:
   determine, at the sidelink Tx mobile station, that the sub-band channel access is passed in at least K sub-bands of N sub-bands associated with the candidate frequency resources, wherein the sidelink PRS transmission is transmitted in the at least K sub-bands based at least in part on the sub-band channel access being passed in the at least K sub-bands of the N sub-bands associated with the candidate frequency resources.

6. The apparatus of claim 5, wherein:
   the at least K sub-bands are associated with contiguous sub-bands; or
   adjacent sub-bands of the at least K sub-bands are separated by a frequency that satisfies a threshold.

7. The apparatus of claim 5, wherein the one or more processors are further configured to:
   re-perform the sub-band channel access within a sidelink PRS transmission occasion based at least in part on the sub-band channel access not being passed in the at least K sub-bands of the N sub-bands associated with the candidate frequency resources; and determine to abandon the sidelink PRS transmission based at least in part on: an expiration of a timer and the sub-band channel access not being passed in the at least K sub-bands of the N sub-bands associated with the candidate frequency resources.

8. The apparatus of claim 1, wherein the one or more processors are further configured to:

transmit, from the sidelink Tx mobile station to the sidelink Rx mobile station, a sidelink positioning assistance message prior to the sidelink PRS transmission or a sidelink positioning assistance message after the sidelink PRS transmission; or receive, at the sidelink Tx mobile station from the sidelink Rx mobile station, the sidelink positioning assistance message prior to the sidelink PRS transmission or the sidelink positioning assistance message after the sidelink PRS transmission, wherein the sidelink positioning assistance message is associated with a different frequency band as compared to the sidelink PRS transmission.

9. The apparatus of claim 8, wherein the sidelink positioning assistance message prior to the sidelink PRS transmission, as transmitted to the sidelink Rx mobile station, indicates a sidelink PRS configuration, wherein the sidelink PRS configuration indicates the candidate frequency resources and the time resources associated with the sidelink PRS transmission.

10. The apparatus of claim 8, wherein the sidelink positioning assistance message after the sidelink PRS transmission, as received from the sidelink Rx mobile station, indicates measurements associated with the sidelink PRS transmission.

11. The apparatus of claim 8, wherein:

the sidelink positioning assistance message after the sidelink PRS transmission indicates time and frequency resources associated with the sidelink PRS transmission; or the sidelink positioning assistance message after the sidelink PRS transmission indicates whether a phase continuity has been maintained for the sidelink PRS transmission.

12. The apparatus of claim 1, wherein the sidelink PRS transmission is associated with a time window to finish the sidelink PRS transmission, wherein the sidelink PRS transmission occurs during a time window of a sidelink PRS transmission occasion, and wherein the time window to finish the sidelink PRS transmission is less than the time window of the sidelink PRS transmission occasion.

13. An apparatus for wireless communication at a sidelink receiving (Rx) mobile station, comprising:

one or more memories; and one or more processors, based at least in part on information stored in the one or more memories, configured to:

receive, at the sidelink Rx mobile station from a sidelink transmitting (Tx) mobile station, a sidelink positioning reference signal (PRS) transmission in one or more sub-bands associated with candidate frequency resources and time resources, wherein the one or more sub-bands have passed a sub-band channel access that senses for a presence of other transmissions; and perform positioning-related measurements using an aggregation of the sidelink PRS transmission received in the one or more sub-bands.

14. The apparatus of claim 13, wherein the one or more processors are further configured to:

transmit, from the sidelink Tx mobile station to the sidelink Rx mobile station and after a sidelink PRS transmission occasion, an indication of time and frequency resources associated with the sidelink PRS transmission.

15. The apparatus of claim 13, wherein the one or more processors are further configured to:

transmit, from the sidelink Rx mobile station to the sidelink Tx mobile station, a sidelink positioning assistance message prior to the sidelink PRS transmission or a sidelink positioning assistance message after the sidelink PRS transmission; or receive, at the sidelink Rx mobile station from the sidelink Tx mobile station, the sidelink positioning assistance message prior to the sidelink PRS transmission or the sidelink positioning assistance message after the sidelink PRS transmission, wherein the sidelink positioning assistance message is associated with a different frequency band as compared to the sidelink PRS transmission.

16. A method of wireless communication performed by a sidelink transmitting (Tx) mobile station, comprising:

performing, by the sidelink Tx mobile station, a sub-band channel access in candidate frequency resources of an unlicensed band for a sidelink positioning reference signal (PRS) transmission to occur in time resources, wherein performing the sub-band channel access includes performing sensing for a presence of other transmissions; and transmitting, from the sidelink Tx mobile station to a sidelink receiving (Rx) mobile station, the sidelink PRS transmission for positioning-related measurements that use an aggregation of the sidelink PRS transmission from one or more sub-bands of the unlicensed band, wherein the sidelink PRS transmission is transmitted in the one or more sub-bands in association with the one or more sub-bands passing the sub-band channel access.

17. The method of claim 16, further comprising:

transmitting, from the sidelink Tx mobile station to the sidelink Rx mobile station and after a sidelink PRS transmission occasion, an indication of time and frequency resources associated with the sidelink PRS transmission.

18. The method of claim 16, wherein the candidate frequency resources are configured for the sidelink PRS transmission, wherein the candidate frequency resources correspond to an unlicensed bandwidth that is channelized to form a plurality of sub-bands, and wherein the sub-band channel access is performed for each of the plurality of sub-bands.

19. The method of claim 16, further comprising:

determining, at the sidelink Tx mobile station, the candidate frequency resources for the sidelink PRS transmission; and determining the time resources associated with the sidelink PRS transmission at the sidelink Tx mobile station or determining the time resources based at least in part on an indication received from another sidelink mobile station.

20. The method of claim 16, further comprising:

determining, at the sidelink Tx mobile station, that the sub-band channel access is passed in at least K sub-bands of N sub-bands associated with the candidate frequency resources, wherein the sidelink PRS transmission is transmitted in the at least K sub-bands based at least in part on the sub-band channel access being passed in the at least K sub-bands of the N sub-bands associated with the candidate frequency resources.

21. The method of claim 20, wherein:
the at least K sub-bands are associated with contiguous sub-bands; or
adjacent sub-bands of the at least K sub-bands are separated by a frequency that satisfies a threshold.

22. The method of claim 20, further comprising:
re-performing the sub-band channel access within a sidelink PRS transmission occasion based at least in part on the sub-band channel access not being passed in the at least K sub-bands of the N sub-bands associated with the candidate frequency resources; and
determining to abandon the sidelink PRS transmission based at least in part on: an expiration of a timer and the sub-band channel access not being passed in the at least K sub-bands of the N sub-bands associated with the candidate frequency resources.

23. The method of claim 16, further comprising:
transmitting, from the sidelink Tx mobile station to the sidelink Rx mobile station, a sidelink positioning assistance message prior to the sidelink PRS transmission or a sidelink positioning assistance message after the sidelink PRS transmission; or
receiving, at the sidelink Tx mobile station from the sidelink Rx mobile station, the sidelink positioning assistance message prior to the sidelink PRS transmission or the sidelink positioning assistance message after the sidelink PRS transmission, wherein the sidelink positioning assistance message is associated with a different frequency band as compared to the sidelink PRS transmission.

24. The method of claim 23, wherein the sidelink positioning assistance message prior to the sidelink PRS transmission, as transmitted to the sidelink Rx mobile station, indicates a sidelink PRS configuration, wherein the sidelink PRS configuration indicates the candidate frequency resources and the time resources associated with the sidelink PRS transmission.

25. The method of claim 23, wherein the sidelink positioning assistance message after the sidelink PRS transmission, as received from the sidelink Rx mobile station, indicates measurements associated with the sidelink PRS transmission.

26. The method of claim 23, wherein:
the sidelink positioning assistance message after the sidelink PRS transmission indicates time and frequency resources associated with the sidelink PRS transmission; or
the sidelink positioning assistance message after the sidelink PRS transmission indicates whether a phase continuity has been maintained for the sidelink PRS transmission.

27. The method of claim 16, wherein the sidelink PRS transmission is associated with a time window to finish the sidelink PRS transmission, wherein the sidelink PRS transmission occurs during a time window of a sidelink PRS transmission occasion, and wherein the time window to finish the sidelink PRS transmission is less than the time window of the sidelink PRS transmission occasion.

28. A method of wireless communication performed by a sidelink receiving (Rx) mobile station, comprising:
receiving, at the sidelink Rx mobile station from a sidelink transmitting (Tx) mobile station, a sidelink positioning reference signal (PRS) transmission in one or more sub-bands associated with candidate frequency resources and time resources,
wherein the one or more sub-bands have passed a sub-band channel access that senses for a presence of other transmissions; and
performing positioning-related measurements using an aggregation of the sidelink PRS transmission received in the one or more sub-bands.

29. The method of claim 28, further comprising:
transmitting, from the sidelink Tx mobile station to the sidelink Rx mobile station and after a sidelink PRS transmission occasion, an indication of time and frequency resources associated with the sidelink PRS transmission.

30. The method of claim 28, further comprising:
transmitting, from the sidelink Rx mobile station to the sidelink Tx mobile station, a sidelink positioning assistance message prior to the sidelink PRS transmission or a sidelink positioning assistance message after the sidelink PRS transmission; or
receiving, at the sidelink Rx mobile station from the sidelink Tx mobile station, the sidelink positioning assistance message prior to the sidelink PRS transmission or the sidelink positioning assistance message after the sidelink PRS transmission, wherein the sidelink positioning assistance message is associated with a different frequency band as compared to the sidelink PRS transmission.

* * * * *